United States Patent
Nam

(10) Patent No.: US 11,631,075 B2
(45) Date of Patent: Apr. 18, 2023

(54) MULTIPLE AUTHENTICATION AND PAYMENT SYSTEM AND METHOD USING ESIM

(71) Applicants: Hyundai Motor Company, Seoul (KR); Kia Motors Corporation, Seoul (KR)

(72) Inventor: Hyuk Joo Nam, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 539 days.

(21) Appl. No.: 16/699,975

(22) Filed: Dec. 2, 2019

(65) Prior Publication Data
US 2020/0193411 A1 Jun. 18, 2020

(30) Foreign Application Priority Data
Dec. 14, 2018 (KR) .................. 10-2018-0162082

(51) Int. Cl.
*G06Q 20/32* (2012.01)
*G06Q 50/30* (2012.01)

(52) U.S. Cl.
CPC ......... *G06Q 20/3229* (2013.01); *G06Q 50/30* (2013.01)

(58) Field of Classification Search
CPC ............................ G06Q 20/3229; G06Q 50/30
USPC ........................................................ 705/13
See application file for complete search history.

(56) References Cited

U.S. PATENT DOCUMENTS

| | | | |
|---|---|---|---|
| 2003/0115095 A1* | 6/2003 | Yamauchi | G07F 7/0866 705/13 |
| 2010/0032479 A1* | 2/2010 | Sol | G07B 15/063 235/380 |
| 2011/0137773 A1* | 6/2011 | Davis, III | G01G 19/4142 340/5.82 |
| 2015/0120135 A1* | 4/2015 | Lawrenson | B60W 50/085 701/36 |

(Continued)

FOREIGN PATENT DOCUMENTS

WO    WO-2021121273 A1 *  6/2021    ......... H04L 63/0876

OTHER PUBLICATIONS

Gerpott, T.J., May, S. Embedded Subscriber Identity Module eSIM. Bus Inf Syst Eng 59, 293-296 (2017). https://doi.org/10.1007/s12599-017-0474-4 (Year: 2017).*

*Primary Examiner* — Rupangini Singh
*Assistant Examiner* — Lisa Ma
(74) *Attorney, Agent, or Firm* — Fox Rothschild LLP

(57) ABSTRACT

A multiple authentication and payment system and method using an embedded subscriber identification module (eSIM) are provided, in which one or more users integrate SIMs through software and perform SIM authentication and payment without physically changing SIMs when an eSIM is installed within a vehicle. The method includes detecting whether each smart device carried by at least one passenger contains a pre-registered eSIM and monitoring whether electronic payment occurs. When electronic payment occurs, a payment cost is determined for each passenger with respect to a payment cost of the electronic payment based on information regarding the pre-registered eSIM, and payment is performed according to the determined payment cost for each passenger.

11 Claims, 5 Drawing Sheets

(56) References Cited

U.S. PATENT DOCUMENTS

2017/0297529 A1* 10/2017 Hamilton .............. H04L 67/306
2018/0158254 A1*  6/2018 Fustes .................... H04W 4/02

* cited by examiner

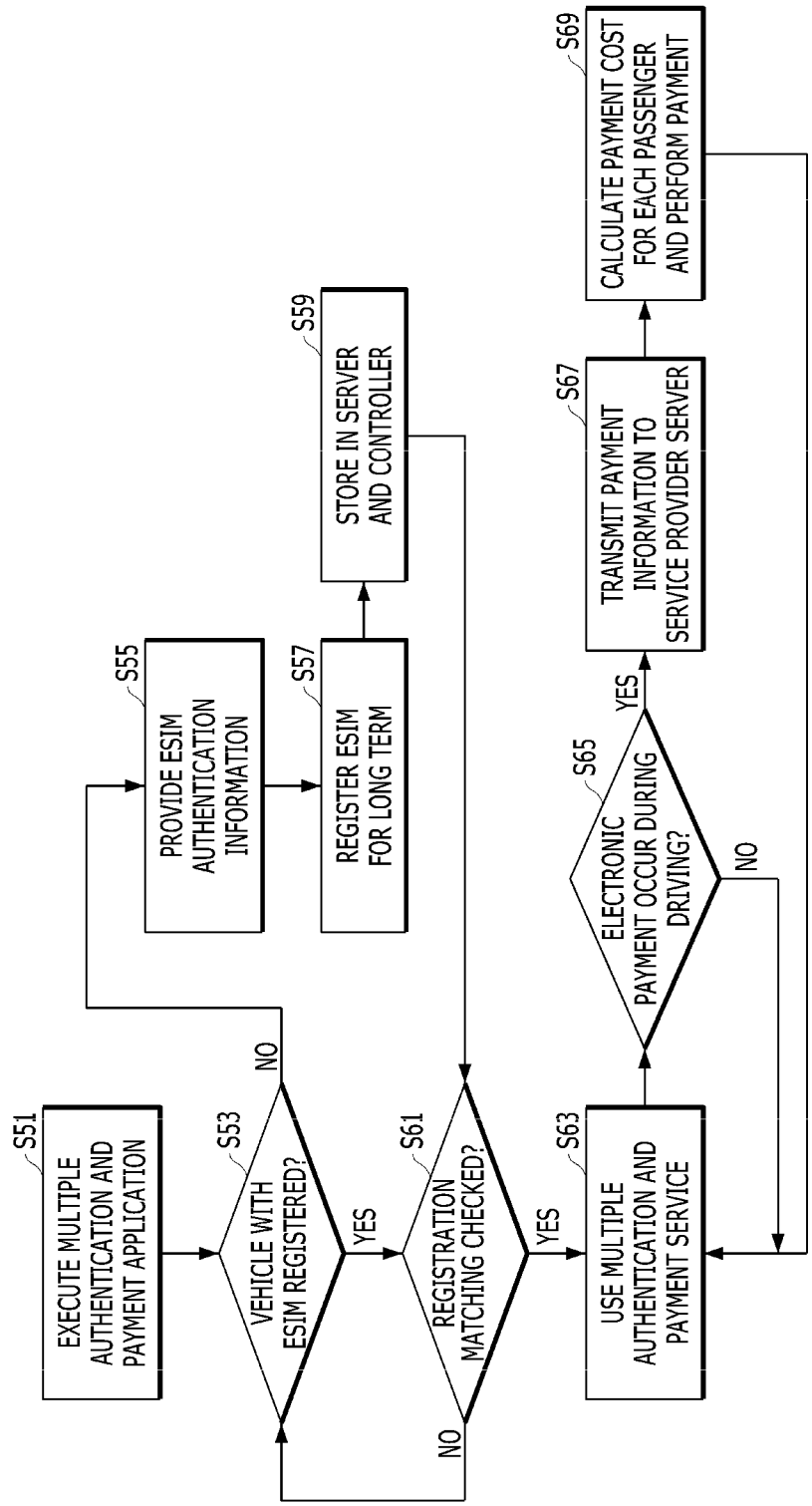

MULTIPLE AUTHENTICATION AND PAYMENT SYSTEM AND METHOD USING ESIM

This application claims the benefit of Korean Patent Application No. 10-2018-0162082, filed on Dec. 14, 2018, which is hereby incorporated by reference as if fully set forth herein.

BACKGROUND

Field of the Invention

The present invention relates to a multiple authentication and payment system and method for performing SIM authentication and payment by integrating SIMs through software by users without physically changing SIMs.

Discussion of the Related Art

Vehicles that have been recently developed perform a connected service such as various telematics services, a function of remote control or expense payment, or the like by applying a concept of a connected vehicle and installing a wireless communication function in a head unit. To embody such a wireless communication function, a subscriber identification module (SIM) or universal subscriber identification module (USIM) card is inserted in the form of a hardware card into a head unit for head unit identification, billing, and the like on a network.

However, such a SIM/USIM card is generally issued in the name of a single user, and thus any expense needs to be paid by a single registered user even if a plurality of people own a vehicle, and it may be difficult to receive a customized/personalized service such a car-to-home path search for each respective owner.

Car-sharing is a service of sharing time in one vehicle by a plurality of people. In particular, car-sharing is configured with a system in which a user rents a vehicle at one of multiple unmanned locations (e.g., vehicle depositories) after membership registration and returns the vehicle to a designated unmanned location or transfers the vehicle to a next user. In addition, car-hailing is a service of connecting a consumer to a service provider that provides a mobile service in real time, and is a service that calls a vehicle that is already traveling. Such car-hailing is similar to a method of calling a taxi through a smartphone application.

A user who uses such a car-sharing or car-hailing service is capable of paying for the service in a wireless manner through a SIM/USIM installed in a vehicle and a smartphone of the user. However, when a plurality of people use the car-sharing or car-hailing service using one vehicle, there is no method of separately paying for service of respective users, for example, of equally distributing expenses incurred by the users. Accordingly, in this case, it is inconvenient to use a general method in which one user pays the entire expense and is then reimbursed by fellow passengers.

SUMMARY

An object of the present invention is to provide a multiple authentication and payment system and method for performing SIM authentication and payment by integrating SIMs through software by users without physically changing SIMs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multiple authentication and payment system using an embedded subscriber identification module (eSIM) may include at least one smart device 11, 13, 15, 21, 23, and 25 having respective eSIMs installed therein and used for authentication of a passenger or releasing the eSIM, and a controller 40 configured to perform communication-connection on a smart device of one or more passengers, register a non-registered eSIM as a new eSIM, register authenticated eSIMs in a service provider server and a controller, calculate a payment cost corresponding to electronic payment for each passenger of the vehicle when electronic payment occurs while the vehicle is traveling, perform payment on the calculated payment cost, and transmit vehicle information, driving information, information regarding the payment cost for each passenger, and eSIM information to the service provider server when driving is terminated.

Additionally, the system includes a payment/authentication server 30 configured to input and display the eSIM authentication number and vehicle identification number in the vehicle by the passenger, and receive and store the eSIM authentication information authenticated by the additional service server, and a payment controller 50 configured to perform payment when an electronic payment occurs and to transmit payment information to the additional service server.

In another aspect of the present invention, a multiple authentication and payment method using an eSIM may include providing a notification to a controller of a ridding state of a vehicle passenger, performing communication-connection by a smart device of one or more passengers by the controller, registering an eSIM that is not registered as a new eSIM and generating the eSIM authentication number by the controller, registering the authenticated eSIM in a service provider and a controller, calculating a payment cost corresponding to electronic payment for each vehicle passenger when electronic payment occurs while the vehicle is traveling, and performing payment on the calculated payment cost, and transmitting vehicle information, driving information, information regarding the payment cost for each passenger, and eSIM information to the service provider server when driving is terminated.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIG. 3 is a flowchart illustrating a multiple authentication and payment procedure using an eSIM according to an exemplary embodiment of the present invention.

DETAILED DESCRIPTION

Figure 1A:
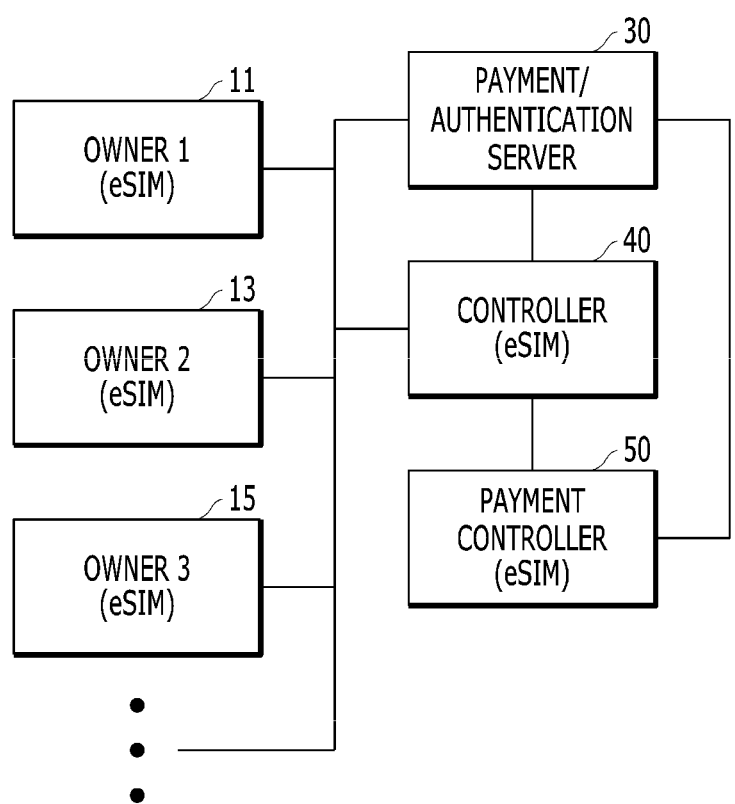
FIGS. 1A to 1C are block diagrams showing a configuration of a multiple authentication and payment system using an embedded subscriber identification module (eSIM) according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Exemplary embodiments of the present invention are described in detail so as for those of ordinary skill in the art to easily implement with reference to the accompanying drawings. However, the present invention may be implemented in various different forms and is not limited to these exemplary embodiments. To clearly describe the present invention, a part without concerning to the description is omitted in the drawings, and like reference numerals in the specification denote like elements.

Throughout the specification, one of ordinary skill would understand terms 'include', 'comprise', and 'have' to be interpreted in default as inclusive or open rather than exclusive or closed unless expressly defined to the contrary. Further, the terms such as "unit", "module", etc. disclosed in the specification mean units for processing at least one function or operation, which may be implemented by hardware, software, or a combination thereof.

In addition, when a certain part "includes" a certain component, this indicates that the part may further include another component instead of excluding another component unless there is no different disclosure. The same reference numbers will be used throughout the drawings and the specification to refer to the same parts.

According to the proposal of one exemplary embodiment of the present invention, whether usage authority is granted and whether a payment is required may be determined with respect to functions, such as when a plurality of users use a connected service, remote control, expense payment, or the like for a single vehicle using an embedded subscriber identification module (eSIM). In particular, the eSIM is a device that replaces a SIM in the form of a physical card and refers to a subscriber authentication device that is capable of being changed or authenticated through software.

Hereinafter, a configuration and control procedure of a multiple authentication and payment system using an eSIM according to an exemplary embodiment of the present invention will be described in detail with reference to FIGS. 1A to 3.

Figure 1B:
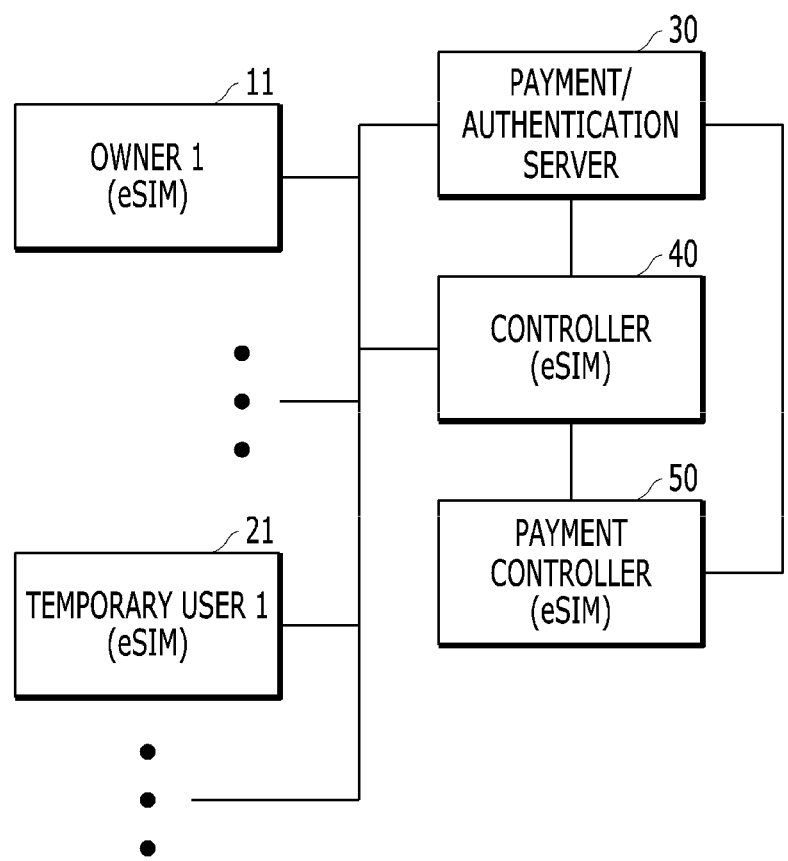
Figure 1C:
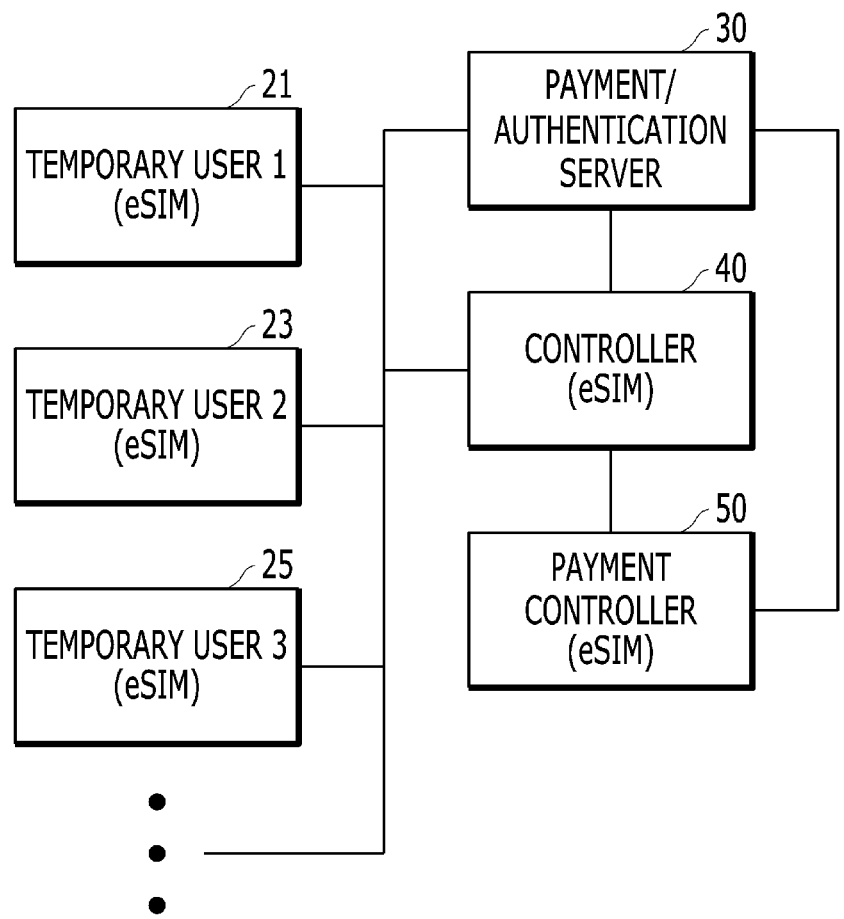

FIGS. 1A to 1C are block diagrams showing a configuration of a multiple authentication and payment system using an eSIM according to an exemplary embodiment of the present invention. In FIGS. 1A to 1C, a controller 40 and a payment controller 50 may be included within a vehicle, the vehicle may be owned by at least one person (i.e., an owner), and a passenger may be at least one of the owner or a temporary user. In particular, the owner may refer to a user who owns shares in the vehicle or a vehicle user that is authenticated by the owner, and the temporary user may refer to a user who periodically uses a vehicle in the form of car-sharing, car-hailing, rental, or the like.

The controller 40 may be embodied in the form of a head unit, but is not limited thereto, and the controller 40 may be configured in any form with communication capabilities between a payment/authentication server 30 and a terminal of an owner/temporary user and capabilities to register/update an eSIM and to perform management and provide a connected service through a method that will be described below. For example, the controller 40 may be embodied in the form of a control device. The controller 40 may contain at least one of an SIM, a USIM, or an eSIM for unique identification in a wireless communication network.

The payment controller 50 may include one or more controllers related to a function accompanying payment. For example, the payment controller 50 may include a head unit (or an audio-video-navigation (AVN) system) for providing a connected service including a billing component, an electronic toll collection system (ETCS), a charging controller of an electric vehicle, or the like, but is not limited thereto. For eSIM registration of a passenger that is not registered in the controller 40, the controller 40 may be configured to output vehicle identification information and authentication information in a form that enables the passenger to check vehicle identification information and authentication information.

For example, the controller 40 may be configured to output a vehicle identification number (e.g., a vehicle identification number or a number of a number plate) and authentication information through a display of an AVN system or a head unit. Alternately, the controller 40 may be configured to transmit corresponding information to a smart device of a passenger through a communication unit for supporting a short-distance wireless communication protocol such as Bluetooth, Wi-Fi, or near field communication (NFC). In particular, the authentication information may be information that is requested to the server 30 by the controller 40 and is received from the server 30, and may be text of a one-time password. In other words, when a smart device that does not contain a pre-registered eSIM attempts eSIM registration using the corresponding authentication information and vehicle identification number, the server 30 may be configured to register the eSIM in conjunction with vehicle identification information with respect to a vehicle that transmits a request for authentication information issued by the server 30.

Moreover, depending on the case (e.g., an external device attempts registration), the payment/authentication server 30 may also be configured to transmit the authentication information and the vehicle identification number to a smart device of a registered owner through a message (e.g., SMS, MMS, or the like).

A user who acquires authentication information and a vehicle identification number may access the payment/authentication server 30 via a smart device application or the like based on the authentication information and the vehicle identification number and may register a pre-contained eSIM in the smart device in conjunction with the corresponding vehicle, or may be issued with a new eSIM that is associated with the corresponding vehicle and may also store the eSIM in the smart device of the user. Particularly, eSIM information registered with respect to the corresponding vehicle may include at least one of information regarding whether the corresponding user is an owner, information regarding a vehicle identification number, or information regarding a service application target (e.g., a payment target) as well as an eSIM corresponding to the smart device.

Further, eSIM information of a separate smart device (i.e., a separate user) registered in conjunction with the corresponding vehicle may be stored in the server 30 and may also be re-transmitted to the controller 40 from the server 30. Accordingly, the controller 40 may contain the eSIM of the separate smart device therein and may also be configured to acquire information regarding whether a corresponding user is an owner, information regarding a vehicle identification number, or information regarding a service application target (e.g., a payment target).

A passenger who registers an eSIM of a smart device of the passenger in conjunction with the corresponding vehicle may check whether the eSIM is registered and then may drive a vehicle or may provide a service when the passengers rides in the vehicle or when a specific function (e.g., a connected service application) is executed. In particular, whether the eSIM is registered may be detected by checking whether the eSIM matches pre-registered eSIM information by the controller 40 through direct wireless communication between the smart device and the controller 40, or when the passenger transmits a request to the server 30 for pre-registration of the eSIM through the application of the smart device, the server 30 may be configured to provide a notification to the controller 40 of the search result.

Referring to FIGS. 1A to 1C, the multiple authentication and payment system using an eSIM according to an exemplary embodiment of the present invention may include smart devices 11, 13, and 15 of at least one owner (e.g., a first, second, and third owner smart device) and smart devices 21, 23, and 25 of a temporary user (e.g., a first, second, and third temporary user smart device), each of which includes an eSIM therein and which are used to authenticate a passenger or to release the eSIM.

Additionally, the system may include the controller 40 configured to detected the total number of passengers by checking eSIM information for each of the passengers who ride in the vehicle, determine whether the total number of passengers within the corresponding vehicle matches the total number of all terminals having registered eSIMs, and output authentication information and vehicle identification information to newly register an eSIM of a passenger that is not registered upon determining that the total number of passengers does not match the total number of terminals.

Further, the system may include the payment/authentication server 30 configured to store eSIM information of a smart device that transmits a request for registration based on the authentication information and vehicle identification number acquired from the corresponding vehicle in conjunction with the corresponding vehicle or to newly issue the associated eSIM, and the payment controller 50 configured to perform payment under operation of the controller 40 when an electronic payment occurs and to transmit information regarding payment to a server of a service provider.

Particularly, when the payment controller 50 proceeds or performs payment, the payment controller 50 performs a procedure of making a request to an entity (e.g., the server 30 or a payment server that perform payment of a corresponding service), which is in charge of payment of a service that performs electronic payment, for payment with respect to a charge to be paid for each passenger using an eSIM that participates in payment among eSIMs of smart devices held by passengers, and receiving the result thereof.

FIG. 1A illustrates the case in which only an owner of a vehicle is within the vehicle and an eSIM registered in a service provider server. FIG. 1B illustrates the case in which an owner and a temporary user of a vehicle are both within the vehicle and an eSIM registered in a service provider server. FIG. 1C illustrates the case in which only a temporary user is within the vehicle and an eSIM not registered in a service provider server.

Figure 2:
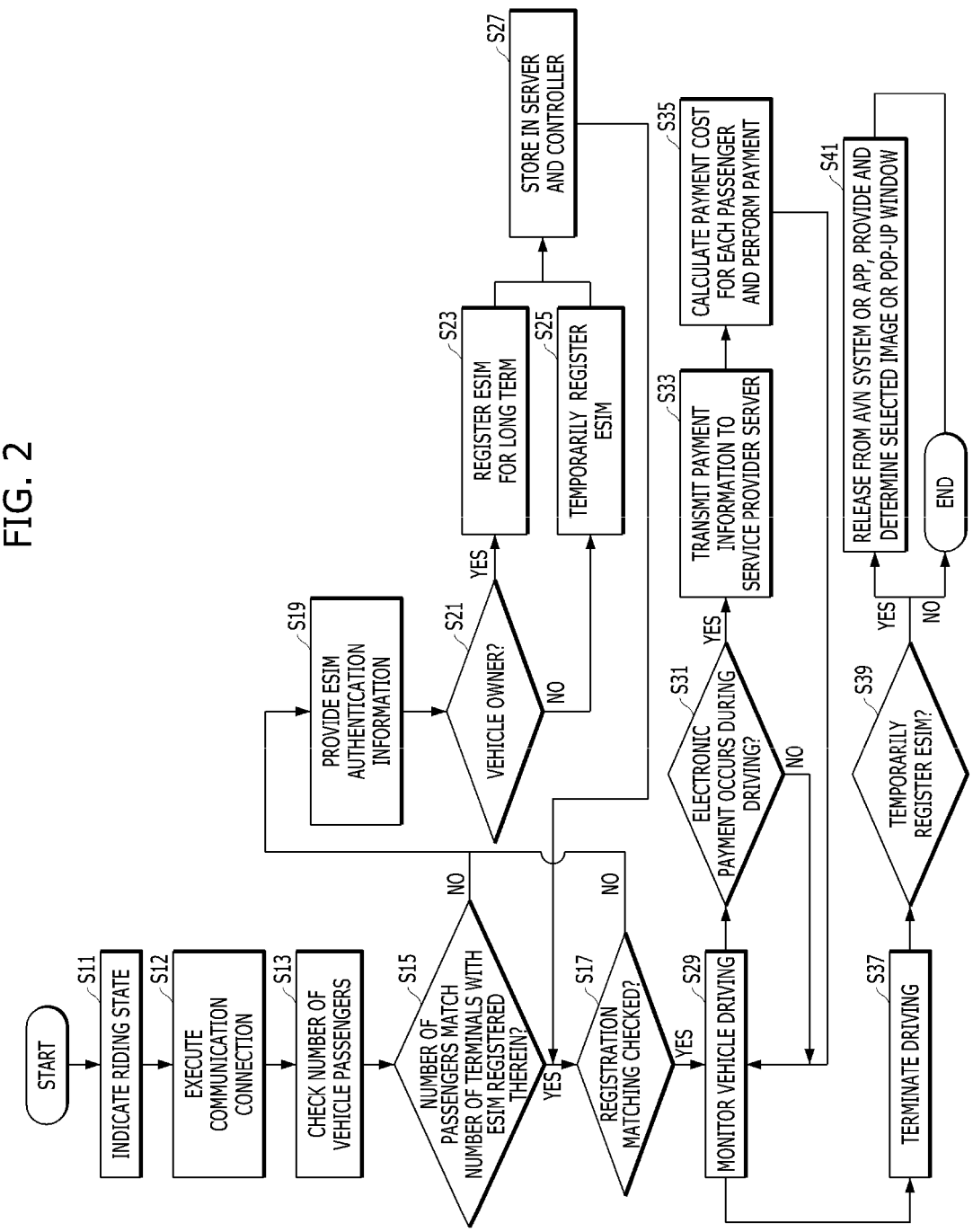
FIG. 2 is a flowchart illustrating a procedure of registering and releasing an eSIM in a multiple authentication and payment procedure using an eSIM according to an exemplary embodiment of the present invention.

FIG. 2 is a flowchart illustrating a procedure of registering and releasing an eSIM in a multiple authentication and payment procedure using an eSIM according to an exemplary embodiment of the present invention.

First, referring to FIG. 2, when the controller 40 of a vehicle detects riding of at least one passenger, (e.g., by detecting turning on of a vehicle or opening of a door) (S11), the controller 40 may be configured to perform communication connection with a smart device (e.g., a smartphone) of one or more passengers within a vehicle (S12), and may then be configured to detect the total number of passengers by checking eSIM information for each respective passenger (S13).

Instead of connection with a separate device, each of the passengers may also check the number of passengers by making a request to the server 30 for checking whether an eSIM of the passenger itself is registered in a corresponding vehicle through a smart device of the passenger and forwarding the result to the controller 40. In particular, the controller 40 may be configured to detect the total number of passengers by checking eSIM information, but may also be configured to detect the number of passengers using a camera installed within a vehicle or a seat detection sensor (not shown) installed in each of front and rear seats of the vehicle.

The controller 40 may also be configured to detect the total number of passengers via a logic combination of eSIM information and the camera or the seat detection sensor (i.e., the total number of passengers is determined only when both the eSIM information and the information from the camera or the seat detection sensor match each other) to more accurately detect the total number of passengers.

When the total number of passengers is inaccurately detected due to presence of a child or an elderly person who does not use a smart device among the passengers, the controller 40 may be configured to signal this result through an audio video navigation graphical user interface (AVN GUI) installed within the vehicle. Additionally, the controller 40 may be configured to signal that a payment method according to the present invention is not possible, or prompt a user to use another payment method.

Further, the controller 40 may be configured to determine whether an eSIM of each of smart devices inside the vehicle is pre-registered in the controller 40 (i.e., whether the controller 40 has eSIM information of each of the smart devices) and determine whether the total number of passengers who ride in the corresponding vehicle matches the number of registered eSIMs (S15). As the determination result, in response to determining that the total number of passengers matches the number of registered eSIMs, the controller 40 may be configured to output eSIM information registered in the AVN GUI and receive final confirmation about whether the total number of passengers matches the number of registered eSIMs from the passenger (S17). Needless to say, in some exemplary embodiments, the present operation S17 may also be omitted.

As the determination result of operation S15, when the controller 40 determines that the total number of passengers does not match (e.g., is different from) the total number of registered eSIMs or when the passenger indicates that the displayed information is inaccurate in operation S17, the controller 40 may be configured to output authentication information and a vehicle identification number to a display or the like of the AVN system to register a smart device that does not have a pre-registered eSIM in the controller 40. The method of acquiring an authentication number and the type of vehicle identification number are the same as in the above description, and thus a repeated description is omitted here.

Furthermore, a passenger who has a smart device, an eSIM which is not registered in a corresponding vehicle, may input at least one of information related to whether the passenger is an owner/temporary user of the corresponding vehicle, information related to a payment target, or a usage period along with authentication information and vehicle identification number through a multiple authentication and payment application (APP) executed in a smart device of the passenger.

Accordingly, the multiple authentication and payment APP executed by the smart device of the corresponding passenger may be configured to transmit the input information to the payment/authentication server 30, and based on whether the passenger who has the corresponding smart device is an owner based on the received information (S21), the payment/authentication server 30 may be configured to perform any one of long-term registration when the passenger is the owner (S23) and temporary registration based on usage period information (S25). In particular, when the smart device pre-holds eSIM information, the server 30 may be configured to receive the corresponding eSIM and register the same in conjunction with the vehicle, and otherwise, may newly issue an eSIM in the corresponding smart device and then register the issued eSIM in conjunction with the corresponding vehicle.

The eSIM information (i.e., at least one of information on whether a passenger is an owner/temporary user, information on a payment target, or information on a usage period and an eSIM of the corresponding smart device) may be registered in conjunction with the vehicle and may also be forwarded to the controller 40 of the vehicle (S27).

When the total number of passengers is finally detected to match the number of registered eSIMs in operation S17, the controller 40 may be configured to monitor the driving situation of the corresponding vehicle (S29) and simultaneously determine whether electronic payment occurs while the vehicle is traveling (S31). In particular, as the determination result of operation S31, when electronic payment occurs, the payment controller 50 may be configured to transmit a payment request to a service provider server corresponding to the electronic payment (S33).

The controller 40 may be configured to transmit or forward registered eSIM information of a separate passenger to the payment controller 50. The payment controller 50 may then be configured to calculate expenses corresponding to the electronic payment (e.g., equalization or distribution based on a preset ratio) and perform payment for each of passengers within the corresponding vehicle based on the acquired eSIM information (S35). In some exemplary embodiments, when the payment controller 50 transmits information regarding total payment costs, the controller 40 may be configured to calculate payment cost for each passenger and then forward the same along with eSIM information of a passenger to the payment controller 50, and the payment controller 50 may also be configured to perform payment based on the information acquired from the controller 40.

When driving is terminated, the controller 40 may be configured to detect whether a temporary eSIM is present among eSIMs of smart devices of passengers (S39). When a temporary eSIM is present, the controller 40 may be configured to output or display a menu or a pop-up window for determining whether temporary registration is released, on an AVN system or a corresponding smart device (S41). This may be considered to be a procedure of deleting eSIM information of a user that is not to be used any longer after short-term rental or car-sharing, from the vehicle.

FIG. 3 is a flowchart illustrating a multiple authentication and payment procedure using an eSIM according to an exemplary embodiment of the present invention. In FIG. 3, it may be assumed that a vehicle owner newly registers eSIM information through a smart device of the vehicle owner or pre-registers the eSIM information to use a connected service.

Referring to FIG. 3, when an application related to a connected service is executed in a vehicle (S51), the controller 40 may be configured to determine whether an eSIM stored in a smart device (e.g., a smartphone) of a passenger is registered in the corresponding vehicle (S53). In particular, as the determination result of operation S53, when the eSIM is not determined to be pre-registered in the corresponding vehicle, the controller 40 may be configured to newly register the corresponding eSIM as described in detail with reference to FIG. 2. In other words, the present operations S55, S57, and S59 may correspond to operations S19, S23, and S27 described above with reference to FIG. 2, and thus a repeated description is omitted for clarity of the specification.

As the determination result of operation S53, when the eSIM is determined to be registered in the corresponding vehicle, the controller 40 may be configured to receive confirmation regarding whether the eSIM matches pre-registered eSIM information from a passenger (S61). The present procedure also corresponds to operation S17 of FIG. 2, and thus a description thereof is omitted.

When the eSIM matches the pre-registered eSIM information, the controller 40 may be configured to monitor whether payment occurs in the connected service application (S63), and when electronic payment occurs during use (S65), the payment controller 50 may be configured to transmit payment information to a service provider server (S67), and calculate a payment cost based on the registered eSIM information and perform payment of the calculated payment cost (S69).

Hereinafter, a reference of operations S35 and S69 of calculating the payment cost of FIGS. 2 and 3 will be described. As described above, when an eSIM of a smart device is registered in conjunction with a vehicle, a range, an authorization, and a payment target of a server may be selected, and this information may again be transmitted to the controller 40 from the server 30. Accordingly, the controller 40 may manage and store tables formed as shown in Tables 1 to 3 below.

TABLE 1

| Electronic payment target | Owner1 | Owner2 | Owner3 |
|---|---|---|---|
| Remote control | ◯ | ◯ | X |
| Server route search | ◯ | X | X |
| High pass | ◯ | ◯ | ◯ |

TABLE 2

| Electronic payment target | Owner1 | Owner2 | Temporary user 1 |
|---|---|---|---|
| Remote control | ◯ | ◯ | X |
| Server route search | ◯ | X | ◯ |
| High pass | ◯ | ◯ | ◯ |

TABLE 3

| Electronic payment target | Temporary user 1 | Temporary user 2 | Temporary user 3 |
|---|---|---|---|
| Remote control | X | ◯ | ◯ |
| Server route search | ◯ | ◯ | ◯ |
| High pass | ◯ | ◯ | ◯ |

For example, Tables 1, 2, and 3 above may correspond to the situations shown in FIGS. 1A, 1B, and 1C, respectively. Based on the above tables, whether service is allowable and whether payment participation is performed for each service may be determined. When payment participation is indicated by "X", a user of a corresponding eSIM may be excluded from a target of split payment.

Accordingly, the payment controller 50 may be configured to determine a payment target corresponding to cost splitting among passengers when a payment event occurs, may split a cost as many ways as the number of eSIMs corresponding to payment targets, and perform split payment for each user.

Additionally, costs incurred every time a service is used, such as a highway toll, may be split and paid by users of eSIMs within a vehicle. With regard to an owner, costs claimed on a yearly/monthly basis, such as remote control or server route search, may be paid by all owners, and costs incurred every time a service is used, such as the highway toll or the like, may be paid based on an eSIM of an owner that rides in a vehicle. For example, when a highway toll cost is incurred while owners 1 and 2 ride in the vehicle, half of the cost may be imposed on the respective owners, and when only owner 1 rides in the vehicle, the corresponding cost may be imposed on owner 1 only.

The multiple authentication and payment method using an eSIM may have the following advantages.

First, the method may use a multiple authentication and payment service using an eSIM provided by a service provider based on a vehicle passenger using an eSIM (e.g., Car-to-home, route search, or the like).

Second, it may be possible to register one or more users through an eSIM, and thus a corresponding vehicle may be capable of being remotely controlled (e.g., Remote starting/air conditioning, or HOME-to-CAR).

Third, when one or more users simultaneously use a service through eSIM multiple authentication, the corresponding cost of an expressway payment system (e.g., high pass, eTOLL, or the like) may be split or may be imposed on the user who actually uses a vehicle.

Fourth, when a car-sharing or car-hailing service is used, if a specific user temporarily rides in a corresponding vehicle, the corresponding cost may also be equally paid using an integrated payment method.

Fifth, both users using a car-sharing or car-hailing service for a long term and users who are temporarily registered and use the service may be easily registered in an eSIM authentication and payment system.

Sixth, the costs for respective functions, which are incurred when a car-sharing or car-hailing service is used (e.g., an entity for which electronic payment is possible, such as TMU payment, toll, or charging costs of an electric vehicle) may be equally imposed on passengers.

In the multiple authentication and payment system and method using an eSIM according to the present invention, one or more users may integrate SIMs through software and may perform SIM authentication and payment without physically changing SIMs in the state in which an eSIM is installed within a vehicle, and thus when a plurality of passengers simultaneously uses a specific supplementary service in a single vehicle of a user, convenience of authentication and payment may be greatly enhanced.

It will be appreciated by persons skilled in the art that that the effects that could be achieved with the present invention are not limited to what has been particularly described hereinabove and other advantages of the present invention will be more clearly understood from the detailed description.

The aforementioned present invention can also be embodied as computer readable code stored on a non-transitory computer readable recording medium. The non-transitory computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A payment method of a vehicle using an embedded subscriber identification module (eSIM), comprising:
    detecting, by a controller, whether a smart device carried by at least one passenger contains a pre-registered eSIM;
    in response to detecting that the eSIM contained in the smart device is pre-registered, monitoring, by the controller, whether electronic payment occurs;
    during the monitoring, when electronic payment occurs, determining, by the controller, a payment cost for each passenger with respect to a payment cost of the electronic payment based on information regarding the pre-registered eSIM; and
    performing, by the controller, payment according to the determined payment cost for each passenger;

wherein, when the eSIM of a smart device is registered in conjunction with a vehicle, at least one of a range, an authorization, and a payment target of a server is selected;

wherein, when a smart device that does not contain a pre-registered eSIM is detected, outputting, by the controller, a one-time password and a vehicle identification number through a display of an audio video navigation (AVN) system or a head unit; and receiving, by the controller, information regarding an eSIM saved in a payment/authentication server from the payment/authentication server based on the one-time password by the smart device that does not contain the pre-registered eSIM.

2. The method of claim 1, wherein the determining of the payment cost for each passenger is performed by differently determining whether a passenger corresponding to the each smart device participates in payment according to a type of the electronic payment.

3. The method of claim 2, wherein the information regarding the pre-registered eSIM includes information regarding whether payment participation is performed for each service.

4. The method of claim 3, wherein the determining of the payment cost for each passenger includes:

dividing, by the controller, the payment cost by a number of smart devices as a participation target of the electronic payment according to whether payment participation is performed for each service among smart devices carried by the at least one passenger.

5. The method of claim 1, wherein the detection of whether a smart device carried by at least one passenger contains a pre-registered eSIM is performed when the vehicle is turned on or a connected service application is executed in the vehicle.

6. A non-transitory computer readable recording medium having recorded thereon a program for executing the method of claim 1.

7. A vehicle, comprising:

a first controller configured to:

detect whether a smart device carried by at least one passenger contains a pre-registered embedded subscriber identification module (eSIM);

monitor whether electronic payment occurs in response to detecting that the eSIM contained in the smart device is pre-registered; and determine a payment cost for each passenger with respect to a payment cost of the electronic payment based on information regarding the pre-registered eSIM when electronic payment occurs while whether the electronic payment occurs is monitored; and a second controller configured to perform payment according to the determined payment cost for each passenger;

wherein the first controller is configured to:

when the eSIM of a smart device is registered in conjunction with a vehicle, at least one of a range, an authorization, and a payment target of a server is selected;

output a one-time password and a vehicle identification number through a display of an audio video navigation (AVN) system or a head unit when a smart device that does not contain a pre-registered eSIM is detected; and receive information regarding an eSIM saved in a payment/authentication server from the payment/authentication server based on the one-time password by the smart device that does not contain that pre-registered eSIM.

8. The vehicle of claim 7, wherein the first controller is configured to differently determine whether a passenger corresponding to the each smart device participates in payment according to a type of the electronic payment.

9. The vehicle of claim 8, wherein the information regarding the pre-registered eSIM includes information regarding whether payment participation is performed for each service.

10. The vehicle of claim 9, wherein the first controller is configured to divide the payment cost by a number of smart devices as a participation target of the electronic payment according to whether payment participation is performed for each service among smart devices carried by the at least one passenger.

11. The vehicle of claim 7, wherein the first controller is configured to detect whether a smart device carried by at least one passenger contains a pre-registered eSIM when the vehicle is turned on or a connected service application is executed in the vehicle.

* * * * *